US012452847B2

United States Patent
Gao et al.

(10) Patent No.: US 12,452,847 B2
(45) Date of Patent: Oct. 21, 2025

(54) SYNCHRONIZATION SIGNAL BLOCK DETERMINING METHOD AND RELATED APPARATUS

(71) Applicant: Huawei Technologies Co., Ltd., Shenzhen (CN)

(72) Inventors: Kuandong Gao, Chengdu (CN); Mao Yan, Chengdu (CN); Huang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 498 days.

(21) Appl. No.: 17/931,303

(22) Filed: Sep. 12, 2022

(65) Prior Publication Data
US 2023/0007656 A1    Jan. 5, 2023

Related U.S. Application Data

(63) Continuation of application No. PCT/CN2020/079363, filed on Mar. 13, 2020.

(51) Int. Cl.
*H04W 72/0453* (2023.01)
(52) U.S. Cl.
CPC ............. *H04W 72/0453* (2013.01)
(58) Field of Classification Search
CPC .......... H04W 72/0453; H04W 56/0015; H04L 5/0048; H04L 5/0053; H04L 5/0094
See application file for complete search history.

(56) References Cited

U.S. PATENT DOCUMENTS

| | | | |
|---|---|---|---|
| 2018/0020415 A1* | 1/2018 | Yilmaz | H04W 56/0015 |
| 2019/0159148 A1* | 5/2019 | Jung | H04W 56/0005 |
| 2019/0173686 A1* | 6/2019 | Takehara | H04L 12/2827 |
| 2019/0200307 A1* | 6/2019 | Si | H04W 72/0453 |
| 2019/0222340 A1* | 7/2019 | Kaikkonen | H04J 11/0073 |
| 2020/0228275 A1* | 7/2020 | Li | H04W 72/0446 |
| 2020/0260392 A1* | 8/2020 | Tang | H04W 48/12 |
| 2020/0337002 A1* | 10/2020 | Ko | H04L 5/0016 |

(Continued)

FOREIGN PATENT DOCUMENTS

| | | |
|---|---|---|
| CA | 3080867 A1 | 5/2019 |
| CN | 108702700 A | 10/2018 |

(Continued)

OTHER PUBLICATIONS

"Implementation of SDR-based 5G NR Cell Search Equipment"; Kim et al.; 2020 22nd International Conference on Advanced Communication Technology (ICACT); Apr. 2020 (Year: 2020).*

(Continued)

*Primary Examiner* — Benjamin H Elliott, IV
(74) *Attorney, Agent, or Firm* — Slater Matsil, LLP

(57) ABSTRACT

Embodiments of this application disclose a synchronization signal block determining method and a related apparatus. The method includes: A terminal device detects a first synchronization signal block (SSB); the terminal device determines a second SSB based on the first SSB, where a frequency domain position of the first SSB and a frequency domain position of the second SSB are within a preset bandwidth, or a difference between frequency domain positions of the first SSB and the second SSB is a preset value. The second SSB may be considered as a backup SSB for the first SSB.

20 Claims, 3 Drawing Sheets

S101. A terminal device detects a first synchronization signal block SSB

S102. The terminal device determines a second SSB based on the first SSB

(56) References Cited

U.S. PATENT DOCUMENTS

| | | | |
|---|---|---|---|
| 2020/0359343 A1* | 11/2020 | Da | H04J 11/0069 |
| 2021/0007065 A1* | 1/2021 | Ko | H04W 56/00 |
| 2021/0022069 A1* | 1/2021 | Liu | H04W 48/10 |
| 2021/0067298 A1* | 3/2021 | Si | H04L 5/0048 |
| 2021/0168737 A1* | 6/2021 | Tang | H04W 56/00 |
| 2022/0386251 A1* | 12/2022 | Da | H04W 72/00 |
| 2023/0007656 A1* | 1/2023 | Guo | H04L 5/0094 |

FOREIGN PATENT DOCUMENTS

| | | |
|---|---|---|
| CN | 110392991 A | 10/2019 |
| CN | 110521146 A | 11/2019 |
| EP | 3691374 A1 | 8/2020 |
| EP | 3726895 A1 | 10/2020 |
| WO | 2019063020 A1 | 4/2019 |
| WO | 2019066575 A1 | 4/2019 |
| WO | 2019137228 A1 | 7/2019 |

OTHER PUBLICATIONS

PCT/CN2020/079363 International Search Report (English Translation); Dec. 4, 2020 (Year: 2020).*

"Remaining issue for SSB raster design of Rel-16 NR-U for 5GHz band"; Ericsson; 3GPP TSG-RAN4 Meeting #93 R4-1914224 Reno, USA, Nov. 18-22, 2019 (Year: 2019).*

"Discussion on sync raster for NR-U"; ZTE; 3GPP TSG-RAN WG4 Meeting#93 R4-1914231 Reno, USA, Nov. 18-Nov. 22, 2019 (Year: 2019).*

"Synchronization raster for NR-U"; Huawei et al.; 3GPP TSG-RAN WG4 Meeting #93 R4-1914577 Reno, USA, Nov. 18-22, 2019 (Year: 2019).*

Nokia et al., "Initial Access Signals and Channels for NR-U", 3GPP TSG RAN WG1 Meeting #96bis, R1-1904192, Xi'an, China, Apr. 8-12, 2019, 24 pages.

* cited by examiner

SYNCHRONIZATION SIGNAL BLOCK DETERMINING METHOD AND RELATED APPARATUS

CROSS-REFERENCE TO RELATED APPLICATIONS

This application is a continuation of International Application No. PCT/CN2020/079363, filed on Mar. 13, 2020, the disclosure of which is hereby incorporated by reference in its entirety.

TECHNICAL FIELD

This application relates to the field of mobile communication technologies, and in particular, to a synchronization signal block determining method and a related apparatus.

BACKGROUND

A synchronization signal block is a signal structure defined in new radio (NR), and includes at least one of a primary synchronization signal (PSS), a secondary synchronization signal (SSS), and a physical broadcast channel (PBCH). The PSS and the SSS are mainly used to help user equipment (UE) identify a cell and synchronize with the cell. The PBCH includes most-basic system information, for example, a system frame number or intra-frame timing information. The UE cannot access the cell unless the UE successfully receives the synchronization signal block.

Two types of SSBs are defined in NR. One is a cell-defining (CD) SSB, and is referred to as a CD-SSB for short, and the other is a non-cell-defining SSB (NCD) SSB, and is referred to as an NCD-SSB for short. The NCD-SSB indicates a frequency domain position of the CD-SSB. Generally, in one frequency domain bandwidth, NR may support a plurality of SSBs but support only one CD-SSB. Data transmission is performed in a cell by using a frequency domain position of a CD-SSB. This manner limits a coverage area of the cell.

SUMMARY

This application provides a synchronization signal block determining method and a related apparatus, so that a terminal device can determine a second SSB based on a detected first SSB, and the second SSB may be considered as a backup SSB for the first SSB. The terminal device may combine the received SSBs by using the found first SSB and second SSB, to improve a signal-to-noise ratio and expand a coverage area of a cell.

According to a first aspect, this application provides a synchronization signal block determining method. The method includes: A terminal device detects a first synchronization signal block SSB; and the terminal device determines a second SSB based on the first SSB; and a frequency domain position of the first SSB and a frequency domain position of the second SSB are within a preset bandwidth, or a difference between frequency domain positions of the first SSB and the second SSB is a preset value, and both the first SSB and the second SSB are cell-defining synchronization signal blocks (CD-SSBs). The second SSB may be considered as a backup SSB for the first SSB. In this manner, after finding the first SSB and the second SSB, the terminal device may combine the received SSBs to improve a signal-to-noise ratio, so that power of a noise signal in a received signal is reduced by half, reliability of information transmission is improved, and further a coverage area of a cell is expanded.

With reference to the first aspect, in a possible implementation, the preset bandwidth is one of 21 resource blocks (RBs), 22 RBs, 23 RBs, 24 RBs, 48 RBs, or 96 RBs.

With reference to the first aspect, in a possible implementation, an absolute value of the preset value is one or more of 21, 22, 23, 24, 25, 26, 27, 28, 29, 30, 31, 32, 33, 34, 35, 37, 38, 41, 42, 43, 47, 49, 95, or 97 resource blocks (RBs). The preset value may be a positive value or a negative value.

With reference to the first aspect, in a possible implementation, the frequency domain position of the first SSB belongs to a global synchronization channel number (GSCN), and the frequency domain position of the second SSB does not belong to the GSCN. In this manner, another terminal device can be prevented from detecting the second SSB, so that a problem that a cell corresponding to the first SSB is different from a cell corresponding to the second SSB is avoided for the terminal device.

With reference to the first aspect, in a possible implementation, the first SSB and the second SSB corresponding to a same time index have a quasi co-location (QCL) relationship. In this manner, the terminal device can receive information about the first SSB and the second SSB.

With reference to the first aspect, in a possible implementation, the cell corresponding to the first SSB is the same as the cell corresponding to the second SSB.

With reference to the first aspect, in a possible implementation, information carried in a synchronization signal of the first SSB is the same as information carried in a synchronization signal of the second SSB, and information carried in a physical broadcast channel (PBCH) of the first SSB is the same as information carried in a PBCH of the second SSB.

With reference to the first aspect, in a possible implementation, the method further includes: The terminal device combines the PBCH of the first SSB and the PBCH of the second SSB and demodulates a combined PBCH.

According to a second aspect, this application provides a synchronization information block determining method. The method includes: A terminal device receives a first synchronization signal of a first synchronization signal block (SSB) sent by a network device; the terminal device determines a frequency domain position of the first SSB based on the first synchronization signal; and the terminal device determines a frequency domain position of a second SSB based on the frequency domain position of the first SSB. The second SSB may be considered as a backup SSB for the first SSB. In this manner, after finding the first SSB and the second SSB, the terminal device may combine the received SSBs to improve a signal-to-noise ratio, so that power of a noise signal in a received signal is reduced by half, reliability of information transmission is improved, and further a coverage area of a cell is expanded.

With reference to the second aspect, in a possible implementation, that the terminal device determines a frequency domain position of a second SSB based on the frequency domain position of the first SSB includes: The terminal device detects a second synchronization signal of the second SSB within a preset bandwidth to which the frequency domain position of the first SSB belongs; and the terminal device determines the frequency domain position of the second SSB based on the second synchronization signal.

With reference to the second aspect, in a possible implementation, the preset bandwidth is any one of 21 RBs, 22 RBs, 23 RBs, 24 RBs, 48 RBs, or 96 RBs.

With reference to the second aspect, in a possible implementation, that the terminal device determines a frequency domain position of a second SSB based on the frequency domain position of the first SSB includes: The terminal device detects a third synchronization signal of the second SSB at a frequency domain position that differs from the frequency domain position of the first SSB by a preset value; and the terminal device determines the frequency domain position of the second SSB based on the third synchronization signal.

With reference to the second aspect, in a possible implementation, an absolute value of the preset value is any one of 21, 22, 23, 24, 25, 26, 27, 28, 29, 30, 31, 32, 33, 34, 35, 37, 38, 41, 42, 43, 47, 49, 95, or 97. The preset value may be a positive value or a negative value.

With reference to the second aspect, in a possible implementation, the frequency domain position of the first SSB belongs to a global synchronization channel number (GSCN), and the frequency domain position of the second SSB does not belong to the GSCN. In this manner, another terminal device can be prevented from detecting the second SSB, so that a problem that a cell corresponding to the first SSB is different from a cell corresponding to the second SSB is avoided for the terminal device.

With reference to the second aspect, in a possible implementation, the first SSB and the second SSB corresponding to a same time index have a quasi co-location (QCL) relationship. In this manner, the terminal device can receive information about the first SSB and the second SSB.

With reference to the second aspect, in a possible implementation, the first SSB is a cell-defining synchronization signal block (CD-SSB), and the second SSB is a CD-SSB.

With reference to the second aspect, in a possible implementation, the cell corresponding to the first SSB is the same as the cell corresponding to the second SSB.

With reference to the second aspect, in a possible implementation, information carried in a synchronization signal of the first SSB is the same as information carried in a synchronization signal of the second SSB, and information carried in a physical broadcast channel (PBCH) of the first SSB is the same as information carried in a PBCH of the second SSB.

With reference to the second aspect, in a possible implementation, the method further includes: The terminal device combines the PBCH of the first SSB and the PBCH of the second SSB and demodulates a combined.

According to a third aspect, this application provides a communication apparatus. The communication apparatus includes a detection unit and a determining unit. The detection unit is configured to detect a first synchronization signal block (SSB), and the determining unit is configured to determine a second SSB based on the first SSB. A frequency domain position of the first SSB and a frequency domain position of the second SSB are within a preset bandwidth, or a difference between frequency domain positions of the first SSB and the second SSB is a preset value, and both the first SSB and the second SSB are cell-defining synchronization signal blocks (CD-SSBs). The second SSB may be considered as a backup SSB for the first SSB. In this manner, after finding the first SSB and the second SSB, the communication apparatus may combine the received SSBs to improve a signal-to-noise ratio, so that power of a noise signal in a received signal is reduced by half, reliability of information transmission is improved, and further a coverage area of a cell is expanded.

With reference to the third aspect, in a possible implementation, the preset bandwidth is one of 21 resource blocks (RBs), 22 RBs, 23 RBs, 24 RBs, 48 RBs, or 96 RBs.

With reference to the third aspect, in a possible implementation, an absolute value of the preset value is one or more of 21, 22, 23, 24, 25, 26, 27, 28, 29, 30, 31, 32, 33, 34, 35, 37, 38, 41, 42, 43, 47, 49, 95, or 97 resource blocks (RBs). The preset value may be a positive value or a negative value.

With reference to the third aspect, in a possible implementation, the frequency domain position of the first SSB belongs to a global synchronization channel number (GSCN), and the frequency domain position of the second SSB does not belong to the GSCN. In this manner, another communication apparatus can be prevented from detecting the second SSB, so that a problem that a cell corresponding to the first SSB is different from a cell corresponding to the second SSB is avoided for the terminal device.

With reference to the third aspect, in a possible implementation, the first SSB and the second SSB corresponding to a same time index have a quasi co-location (QCL) relationship. In this manner, the communication apparatus can receive information about the first SSB and the second SSB.

With reference to the third aspect, in a possible implementation, the cell corresponding to the first SSB is the same as the cell corresponding to the second SSB.

With reference to the third aspect, in a possible implementation, information carried in a synchronization signal of the first SSB is the same as information carried in a synchronization signal of the second SSB, and information carried in a physical broadcast channel (PBCH) of the first SSB is the same as information carried in a PBCH of the second SSB.

With reference to the third aspect, in a possible implementation, the communication apparatus further includes a demodulation unit, where the demodulation unit is configured to combine the PBCH of the first SSB and the PBCH of the second SSB and demodulate a combined PBCH.

According to a fourth aspect, this application provides another communication apparatus. The communication apparatus includes a receiving unit, a first determining unit and a second determining unit. The receiving unit is configured to receive a first synchronization signal of a first synchronization signal block (SSB) sent by a network device; the first determining unit is configured to determine a frequency domain position of the first SSB based on the first synchronization signal, and the second determining unit is configured to determine a frequency domain position of a second SSB based on the frequency domain position of the first SSB. The second SSB may be considered as a backup SSB for the first SSB. In this manner, after finding the first SSB and the second SSB, the communication apparatus may combine the received SSBs to improve a signal-to-noise ratio, so that power of a noise signal in a received signal is reduced by half, reliability of information transmission is improved, and further a coverage area of a cell is expanded.

With reference to the fourth aspect, in a possible implementation, the second determining unit is specifically configured to detect a second synchronization signal of the second SSB within a preset bandwidth to which the frequency domain position of the first SSB belongs; and determine the frequency domain position of the second SSB based on the second synchronization signal.

With reference to the fourth aspect, in a possible implementation, the preset bandwidth is any one of 21 resource blocks (RBs), 22 RBs, 23 RBs, 24 RBs, 48 RBs, or 96 RBs.

With reference to the fourth aspect, in a possible implementation, the second determining unit is specifically configured to detect a third synchronization signal of the second SSB at a frequency domain position that differs from the frequency domain position of the first SSB by a preset value; and determine the frequency domain position of the second SSB based on the third synchronization signal.

With reference to the fourth aspect, in a possible implementation, an absolute value of the preset value is any one of 21, 22, 23, 24, 25, 26, 27, 28, 29, 30, 31, 32, 33, 34, 35, 37, 38, 41, 42, 43, 47, 49, 95, or 97 resource blocks (RBs). The preset value may be a positive value or a negative value.

With reference to the fourth aspect, in a possible implementation, the frequency domain position of the first SSB belongs to a global synchronization channel number (GSCN), and the frequency domain position of the second SSB does not belong to the GSCN. In this manner, another communication apparatus can be prevented from detecting the second SSB, so that a problem that a cell corresponding to the first SSB is different from a cell corresponding to the second SSB is avoided for the terminal device.

With reference to the fourth aspect, in a possible implementation, the first SSB and the second SSB corresponding to a same time index have a quasi co-location (QCL) relationship. In this manner, the communication apparatus can receive information about the first SSB and the second SSB.

With reference to the fourth aspect, in a possible implementation, the first SSB is a cell-defining synchronization signal block (CD-SSB), and the second SSB is a CD-SSB.

With reference to the fourth aspect, in a possible implementation, the cell corresponding to the first SSB is the same as the cell corresponding to the second SSB.

With reference to the fourth aspect, in a possible implementation, information carried in a synchronization signal of the first SSB is the same as information carried in a synchronization signal of the second SSB, and information carried in a physical broadcast channel (PBCH) of the first SSB is the same as information carried in a PBCH of the second SSB.

With reference to the fourth aspect, in a possible implementation, the communication apparatus further includes a demodulation unit, where the demodulation unit is configured to combine the PBCH of the first SSB and the PBCH of the second SSB and demodulate a combined PBCH.

According to a fifth aspect, this application provides another communication apparatus. The communication apparatus includes a processor and a memory. The memory is configured to store a computer program, and the processor is configured to perform, according to the computer program, the method according to any one of the first aspect or the possible implementations of the first aspect, or perform the method according to any one of the second aspect or the possible implementations of the second aspect.

According to a sixth aspect, this application provides another communication apparatus. The communication apparatus includes a processor, a memory, and a transceiver. The transceiver is configured to receive a signal or send a signal, the memory is configured to store program code, and the processor is configured to invoke the program code from the memory to perform the method according to any one of the first aspect or the possible implementations of the first aspect, or perform the method according to any one of the second aspect or the possible implementations of the second aspect.

According to a seventh aspect, this application provides another communication apparatus. The communication apparatus includes a processor. When the processor invokes a computer program in a memory, the processor performs the method according to any one of the first aspect or the possible implementations of the first aspect, or performs the method according to any one of the second aspect or the possible implementations of the second aspect.

According to an eighth aspect, this application provides a computer-readable storage medium. The computer-readable storage medium includes a computer program or instructions. When the computer program or the instructions are run on a computer, the computer is enabled to perform the method according to any one of the first aspect or the possible implementations of the first aspect, or perform the method according to any one of the second aspect or the possible implementations of the second aspect.

According to a ninth aspect, this application provides a computer program product. The computer program product includes a computer program or instructions. When the computer program or the instructions are run on a computer, the computer is enabled to perform the method according to any one of the first aspect or the possible implementations of the first aspect, or perform the method according to any one of the second aspect or the possible implementations of the second aspect.

According to a tenth aspect, this application provides a chip. The chip includes a processor and a communication interface. The processor is configured to perform the method according to any one of the first aspect or the possible implementations of the first aspect, or perform the method according to any one of the second aspect or the possible implementations of the second aspect.

According to an eleventh aspect, this application provides another chip. The chip includes a processor, a memory, and a communication interface. The memory stores a computer program, and the processor is configured to execute the computer program to perform the method according to any one of the first aspect or the possible implementations of the first aspect, or implement the method according to any one of the second aspect or the possible implementations of the second aspect.

In embodiments of this application, the terminal device may find the second SSB based on the detected first SSB. The second SSB may be considered as a backup SSB for the first SSB. In this manner, after finding the first SSB and the second SSB, the terminal device may combine the received SSBs to improve a signal-to-noise ratio, so that power of a noise signal in a received signal is reduced by half, reliability of information transmission is improved, and further a coverage area of a cell is expanded.

BRIEF DESCRIPTION OF THE DRAWINGS

To describe technical solutions in embodiments of this application more clearly, the following briefly introduces accompanying drawings for describing embodiments. It is clear that the accompanying drawings in the following description show merely some embodiments of this application, and a person of ordinary skill in the art may still derive other drawings from these accompanying drawings without creative efforts.

DETAILED DESCRIPTION OF ILLUSTRATIVE EMBODIMENTS

The following describes the technical solutions in embodiments of this application in more detail.

Terms used in the following embodiments of this application are merely intended to describe particular embodiments, but are not intended to limit this application. Terms "one", "a", "the", "the foregoing", "this", and "the one" of singular forms used in this specification and the appended claims of this application are also intended to include plural forms, unless otherwise specified in the context clearly. It should be further understood that, a term "and/or" used in this application indicates and includes any one or all of possible combinations of one or more listed items.

It should be further understood that, "first", "second", "third", "fourth", and various numbers in this specification are merely used for differentiation for ease of description, and are not intended to limit the scope of embodiments of this application.

Figure 1:
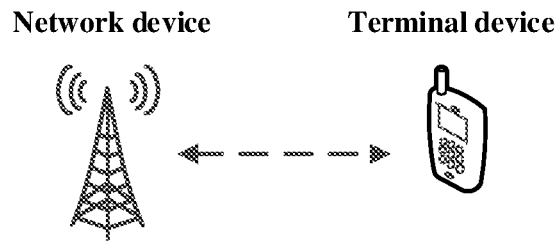
FIG. 1 is a schematic diagram of a network architecture according to an embodiment of this application.

Embodiments of this application may be applied to a network architecture shown in FIG. 1. The network architecture shown in FIG. 1 is a network architecture of a wireless communication system. The network architecture usually includes a terminal device and a network device. A quantity of each type of devices and a form of each device do not constitute a limitation on embodiments of this application. The network device may be a base station (BS). A base station may provide communication services for a plurality of terminal devices, and a plurality of base stations may provide communication services for a same terminal device.

It should be noted that the wireless communication system in embodiments of this application includes, but is not limited to, a narrowband internet of things (NB-IoT) system, a global system for mobile communications (GSM), an enhanced data rate for GSM evolution (EDGE) system, a wideband code division multiple access (WCDMA) system, a code division multiple access 2000 (CDMA2000) system, a time division-synchronization code division multiple access (TD-SCDMA) system, a long term evolution (LTE) system, a 5th generation (5G) mobile communication system, or a future mobile communication system.

In embodiments of this application, the base station is an apparatus deployed in a radio access network to provide a wireless communication function for a terminal device. The base station device may be a base station, a relay station, or an access point. The base station may be a base transceiver station (BTS) in a global system for mobile communications (GSM) or code division multiple access (CDMA) network, may be an NB (NodeB) in wideband code division multiple access (WCDMA), or may be an eNB or an eNodeB (Evolution NodeB) in long term evolution (LTE). The base station device may alternatively be a radio controller in a cloud radio access network (CRAN) scenario. The base station device may alternatively be a base station device in a future 5G network or a network device in a future evolved public land mobile network (PLMN) network. The base station device may alternatively be a wearable device, a vehicle-mounted device, or the like.

The terminal device in embodiments of this application may include user equipment (UE), an access terminal, a UE unit, a UE station, a mobile station, a mobile console, a remote station, a remote terminal, a mobile device, a UE terminal, a terminal, a wireless communication device, a UE agent, or a UE apparatus that has a wireless communication function. The access terminal may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved PLMN.

The following describes some concepts in embodiments of this application.

A quasi co-located (QCL) relationship is an association relationship between two signals. The association in this application may also be referred to as mapping, corresponding, or relating. That there is a QCL relationship between two signals indicates that the two signals may use one or more of a same delay spread, a same Doppler spread, a same average gain, a same average delay, a same spatial domain parameter sending or receiving signal, or a same beam used to send or receive a signal. A QCL relationship parameter may include one or more of a Doppler spread, a Doppler frequency shift, an average delay, a delay spread, and a space domain reception parameter. In a possible solution, the QCL relationship may be classified into four types: "QCL-TypeA": {Doppler frequency shift, Doppler spread, average delay, delay spread}; "QCL-TypeB": {Doppler frequency shift, Doppler spread}; "QCL-TypeC": {Doppler frequency shift, average delay}; and "QCL-TypeD": {space domain reception parameter}. Generally, the QCL relationship parameter may be selected randomly, for example, the average gain and "QCL-TypeD" are selected.

Beam: A beam in an NR protocol may be referred to as a spatial domain filter, a spatial filter, or a spatial parameter. A beam used to send a signal may be referred to as a transmission beam (Tx beam), or may be referred to as a spatial domain transmission filter or a spatial transmission parameter. A beam used to receive a signal may be referred to as a reception beam (Rx beam), or may be referred to as a spatial domain reception filter or a spatial reception parameter (spatial RX parameter).

The transmission beam may refer to distribution of signal strength formed in different directions in space after a signal is transmitted through an antenna, and the reception beam may refer to distribution of signal strength, in different directions in space, of a radio signal received from an antenna. In addition, the beam may be a wide beam, a narrow beam, or a beam of another type. A technology for forming the beam may be a beamforming technology or another technology. The beamforming technology may be specifically a digital beamforming technology, an analog beamforming technology, a hybrid digital/analog beamforming technology, or the like.

The beam generally corresponds to a resource or a signal. For example, during beam measurement, the network device measures different beams by using different resources, and the terminal device feeds back measured resource quality, so that the network device knows quality of a corresponding beam. During data transmission, beam information is also indicated through a resource corresponding to the beam information. For example, the network device indicates information about a PDSCH beam of the terminal device by using a resource in a transmission configuration indicator (TCI) in DCI.

Optionally, a plurality of beams that have a same communication feature or similar communication features are considered as one beam. One beam may include one or more antenna ports, configured to transmit a data channel, a control channel, a sounding signal, and the like. The one or more antenna ports forming the beam may also be considered as one antenna port set.

In embodiments of this application, unless otherwise specified, the beam is a transmission beam of the network device. During beam measurement, each beam of the network device corresponds to one resource. Therefore, an index of the resource may be used to uniquely identify a beam corresponding to the resource. The beam may be represented, in a standard, by using the QCL relationship. In embodiments of this application, a plurality of beams having the QCL relationship may be considered as one beam.

A system information block (SIB) includes system information. A cell may have a plurality of system information blocks, and these system information blocks carry different information, for example, a SIB 1. The SIB 1 mainly carries configuration information of some cells, for example, information related to random access, information related to a PDCCH, information related to other information blocks, information about a cell accessed by the UE, and identification information of the cell.

A synchronization signal block (SSB) may also be referred to as a synchronization signal/physical broadcast channel (synchronization signal/PBCH) block. The synchronization signal block may include one or more of a PBCH, a primary synchronization signal (PSS), and a secondary synchronization signal (SSS). The synchronization signal block may also be referred to as the SSB or the SS/PBCH block for short. The PBCH may include a main information block (MIB), PBCH content generated by a physical layer, and a demodulation reference signal of the PBCH.

Two types of SSBs are defined in 3GPP defined 5G New Radio (NR). One is a cell-defining (CD) SSB, referred to as a CD-SSB for short, and the other is a non-cell defining (NCD) SSB, referred to as an NCD-SSB for short. The NCD-SSB is not associated with the SIB 1, and therefore cannot define a cell. The NCD-SSB may indicate a frequency domain position of the CD-SSB. The terminal device may distinguish between the CD-SSB and the NCD-SSB based on a value of $k_{SSB}$. For example, when the value of $k_{SSB}$ ranges from 0 to 11, the SSB is a CD-SSB; and when the value of $k_{SSB}$ is 12, 13, or 15, the SSB is an NCD-SSB.

Figure 2:
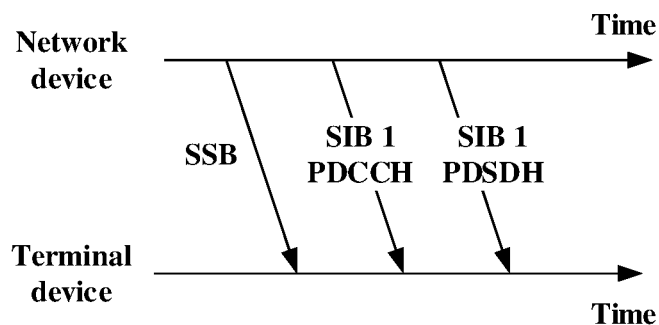
FIG. 2 is a schematic flowchart of accessing a cell by a terminal device according to an embodiment of this application.

The following describes an SSB transmission mode in an existing technology. FIG. 2 is a schematic flowchart of accessing a cell by a terminal device according to an embodiment of this application. First, a terminal device blindly detects an SSB in a specific bandwidth. After detecting a CD-SSB, the terminal device receives MIB information carried in the CD-SSB. The MIB information includes a CORESET time-frequency position indication of a SIB 1 and another indication (for example, a sub-carrier spacing). The terminal device receives a CORESET of the SIB 1 based on the CORESET time-frequency position indication of the SIB 1. The CORESET of the SIB 1 includes a PDCCH of the SIB 1. The PDCCH of the SIB 1 indicates related information such as a PDSCH position and a modulation and coding scheme of the SIB 1. The terminal device receives a PDSCH based on an indication of the PDCCH. In NR, the PDCCH of the SIB 1 and the PDSCH of the SIB 1 correspond to a same sub-carrier spacing. Generally, if the terminal device finds a CD-SSB, the terminal device camps on a cell corresponding to the CD-SSB (or if the terminal device finds a plurality of CD-SSBs, the terminal device may choose to camp on a cell corresponding to one CD-SSB). If the terminal device finds an NCD-SSB, the terminal determines, based on a value of Kssb, that the SSB is an NCD-SSB; and if no associated SIB 1 is found, the terminal device continues to detect a CD-SSB. It can be learned that, in an existing technology, one cell corresponds to one CD-SSB, and a coverage area of the cell is affected by communication quality of the CD-SSB and a noise signal in the environment.

Figure 3:
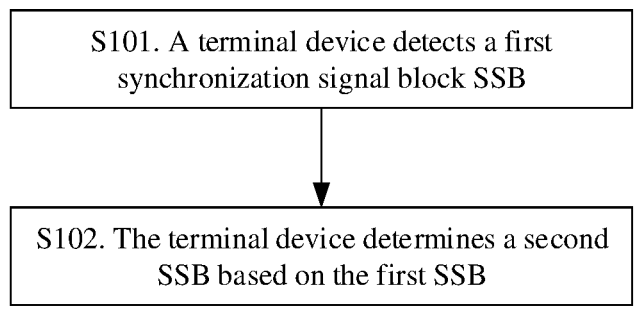
FIG. 3 is a flowchart of an SSB determining method according to an embodiment of this application.

Based on the network architecture, the terminal device, and the network device described in the foregoing content, the following describes an SSB transmission method provided in embodiments of this application. FIG. 3 is a flowchart of an SSB determining method according to an embodiment of this application.

S101. A terminal device detects a first synchronization signal block (SSB).

The first SSB is a CD-SSB. In other words, the first SSB is associated with a SIB 1, and may define a cell.

Specifically, a frequency domain position of the first SSB belongs to a global synchronization channel number (GSCN) or a synchronization raster (sync raster). It should be noted that there is a series of GSCNs in NR, and each GSCN corresponds to one frequency domain position. A frequency domain range of the GSCN is 24.25 GHz to 100 GHz. Starting from 24.2508 GHz, one raster is set every 17.28 MHz. There are a total of 4384 rasters, and indexes are 0 to 4383. For a frequency range above 52.6 GHz, a bandwidth of the frequency range may be greater than or equal to 5 GHz, and 5000/17.28=290. As a result, existing data bits fail to indicate all synchronization rasters in one frequency band, and other positions are non-synchronization rasters or non-GSCNs. Refer to Table 1. Table 1 shows GSCN parameters for the global synchronization frequency raster.

TABLE 1

| Frequency range | SS block frequency position $SS_{REF}$ | GSCN | Range of GSCN |
|---|---|---|---|
| 0-3000 MHz | N * 1200 kHz + M * 50 kHz, N = 1:2499, M∈{1, 3, 5} | 3N + (M − 3)/2 | 2-7498 |
| 3000-24250 MHz | 3000 MHz + N * 1.44 MHz = 0:14756 | 7499 + N | 7499-22255 |
| 24250-100000 MHz | 24250.08 MHz + N * 17.28 MHz, N = 0:4383 | 22256 + N | 22256-26639 |

In a possible implementation, the terminal device may blindly detect an SSB based on the GSCN. Refer to Table 2. Table 2 shows applicable synchronization channel raster entry per operating band. It should be noted that the table corresponds to an FR 1 (frequency range 1). During application, different operating bands are allocated to different operators. For example, n8 is allocated to an operator A. In this case, when searching for an SSB, a terminal device that belongs to the operator A may perform blind detection on a GSCN in a range of 2318-<1>-2395, and search for an SSB only in a case A and with a sub-carrier spacing of 15 kHz.

TABLE 2

| NR operating band | SS block SCS | SS block pattern | Range of GSCN (First-<step size>-last) |
|---|---|---|---|
| n1 | 15 kHz | Case A | 5279-<1>-5419 |
| n2 | 15 kHz | Case A | 4829-<1>-4969 |
| n3 | 15 kHz | Case A | 4517-<1>-4693 |
| n5 | 15 kHz | Case A | 2177-<1>-2230 |
|  | 30 kHz | Case B | 2183-<1>-2224 |
| n7 | 15 kHz | Case A | 6554-<1>-6718 |
| n8 | 15 kHz | Case A | 2318-<1>-2395 |
| n12 | 15 kHz | Case A | 1828-<1>-1858 |
| n20 | 15 kHz | Case A | 1982-<1>-2047 |
| n25 | 15 kHz | Case A | 4829-<1>-4981 |

S102. The terminal device determines a second SSB based on the first SSB.

In some embodiments, the terminal device may determine the frequency domain position of the first SSB based on a first synchronization signal of the first SSB; and then the terminal device determines a frequency domain position of the second SSB based on the frequency domain position of the first SSB. Specifically, based on the description in the foregoing content, the terminal device blindly detects a GSCN within a preset frequency domain range (for example, 2318-<1>-2395). If the terminal device detects the first synchronization signal of the first SSB at a frequency domain position, the terminal device determines the frequency domain position as the frequency domain position of the first SSB.

In some embodiments, $k_{SSB}$ of the first SSB may be 30 or 14. In a possible implementation, after a terminal device only detects the first SSB by using a protocol earlier than the 5G R17 standard protocol, the terminal device no longer searches for the second SSB, and performs communication via a cell determined by the first SSB. After a terminal device detects the first SSB by using a protocol later than the 5G R17 standard protocol, the terminal device may determine the second SSB based on the first SSB, and performs communication via cells determined by the first SSB and the second SSB. Because processing capabilities of terminal devices in different 5G standard protocols are different, in this manner, terminal devices that use different 5G standard protocols have appropriate processing manners for the first SSB.

The following describes manners in which the terminal device determines the frequency domain position of the second SSB based on the frequency domain position of the first SSB.

Manner 1: The terminal device detects a second synchronization signal of the second SSB within a preset bandwidth to which the frequency domain position of the first SSB belongs; and then the terminal device determines the frequency domain position of the second SSB based on the second synchronization signal. That is, the frequency domain position of the first SSB and the frequency domain position of the second SSB are within the preset bandwidth. The frequency domain position of the second SSB is a frequency domain position at which the terminal device detects the second synchronization signal. In some embodiments, the preset bandwidth may be one of 24 resource blocks (RBs), 48 RBs, 96 RBs, 23 RBs, 25 RBs, 21 RBs, or 22 RBs. For example, 21, 22, 23, and 24 are values between a size of a minimum initial bandwidth part and a size of an SSB bandwidth. The frequency domain position may be positive or negative. The frequency domain position may use the first RB of the first SSB as a reference position, use the last RB of the first SSB as a reference position, and use a central RB of the first SSB as a reference position. For example, the tenth RB, the ninth RB, or the eleventh RB is used as the reference position.

Optionally, the terminal device may detect the second synchronization signal within a range between a frequency domain position fewer than the frequency domain position of the first SSB by the preset bandwidth and the frequency domain position of the first SSB. For example, if the frequency domain position of the first SSB is a RBs, and the preset bandwidth is 24 RBs, the terminal device may detect the second synchronization signal within a bandwidth from a−24 RBs to a RBs.

Optionally, the terminal device may detect the second synchronization signal within a range between the frequency domain position of the first SSB and a frequency domain position greater than the frequency domain position of the first SSB by the preset bandwidth. For example, if the frequency domain position of the first SSB is a RBs, and the preset bandwidth is 24 RBs, the terminal device may detect the second synchronization signal within a bandwidth from a RBs to a+24 RBs.

Optionally, the terminal device may detect the second synchronization signal within a range between the frequency domain position fewer than the frequency domain position of the first SSB by the preset bandwidth and the frequency domain position greater than the frequency domain position of the first SSB by the preset bandwidth. For example, if the frequency domain position of the first SSB is a RBs, and the preset bandwidth is 24 RBs, the terminal device may detect the second synchronization signal within a bandwidth from a−24 RBs to a+24 RBs.

It should be noted that, for a manner in which the terminal device determines the frequency domain position of the second SSB based on the second synchronization signal, refer to a manner in which the terminal device determines the frequency domain position of the first SSB based on the first synchronization signal. Details are not described herein again.

Manner 2: The terminal device detects a third synchronization signal of the second SSB at a frequency domain position that differs from the frequency domain position of the first SSB by a preset value; and then the terminal device determines the frequency domain position of the second SSB based on the third synchronization signal. That is, the difference between frequency domain positions of the first SSB and the second SSB are a preset value. In some embodiments, an absolute value of the preset value is one or more of 21, 22, 23, 24, 25, 26, 27, 28, 29, 30, 31, 32, 33, 34, 35, 37, 38, 41, 42, 43, 47, 49, 95, or 97 resource blocks (RBs). These values are less than 98 RBs and greater than 20 RBs, satisfying a bandwidth detection capability of the terminal device. For example, 21, 22, 23, and 24 are values between a size of a minimum initial bandwidth part and a size of an SSB bandwidth.

Optionally, there may be a plus or minus characteristic for the preset value, and the preset value represents the difference between frequency domain positions of the first SSB and the second SSB. The terminal device may detect the third synchronization signal at a frequency domain position obtained by subtracting (or adding) the preset value from (or to) the frequency domain position of the first SSB. For example, if the frequency domain position of the first SSB is b RBs, and the preset value is 21 RBs, the terminal device may detect the third synchronization signal at a frequency domain position of b−21 RBs.

Optionally, there may be no plus or minus characteristic for the preset value, and the preset value represents the absolute value of the difference between frequency domain positions of the first SSB and the second SSB. The terminal device may detect the third synchronization signal at a frequency domain position obtained by subtracting the preset value from the frequency domain position of the first SSB and at a frequency domain position obtained by adding the preset value to the frequency domain position of the first SSB. For example, if the frequency domain position of the first SSB is b RBs, and the preset value is 21 RBs, the terminal device may detect the third synchronization signal at frequency domain positions of b−21 RBs and b+21 RBs.

Optionally, there may be a plurality of preset values. There may be a plus or minus characteristic or there may be no plus or minus characteristic for the plurality of preset values. In an example, the frequency domain position of the first SSB is c RBs, and there are two preset values. There is a plus or minus characteristic for the two preset values, and the two preset values are specifically 27 RBs and −28 RBs. The terminal device may detect the third synchronization signal at frequency domain positions of c−27 RBs and c+28 RBs. In another example, the frequency domain position of the first SSB is c RBs, and there are two preset values. There is no plus or minus characteristic for the two preset values, and the two preset values are specifically 27 RBs and 28 RBs. The terminal device may detect the third synchronization signal at frequency domain positions of c−27 RBs, c−28 RBs, c+27 RBs, and c+28 RBs.

It should be noted that, for a manner in which the terminal device determines the frequency domain position of the second SSB based on the third synchronization signal, refer to the manner in which the terminal device determines the frequency domain position of the first SSB based on the first synchronization signal. Details are not described herein again.

In some embodiments, information carried in a synchronization signal (SS) of the first SSB is the same as information carried in an SS of the second SSB, and information carried in a physical broadcast channel (PBCH) of the first SSB is the same as information carried in a PBCH of the second SSB. For example, synchronization signals of an SSB include a primary synchronization signal (PSS) and a secondary synchronization signal (SSS). Information carried in the primary synchronization signal may be a part of a cell ID, information carried in the secondary synchronization signal may be the other part of the ID, and the information carried in the primary synchronization signal and the information carried in the secondary synchronization signal may form the complete cell ID. Information carried in a PBCH of the SSB may include a system frame number, sub-carrier spacing indication information of system information, configuration information of a physical downlink control channel of the system information, cell re-selection information, index information of the SSB, half-frame indication information, cell access information, and the like.

In some other embodiments, information carried in a primary synchronization signal of the first SSB is the same as information carried in a PSS of the second SSB. Alternatively, information carried in a secondary synchronization signal of the first SSB is the same as information carried in an SSS of the second SSB. Alternatively, the information carried in the physical broadcast channel (PBCH) of the first SSB is the same as the information carried in the PBCH of the second SSB. In some other embodiments, information carried in an SSS of the first SSB is the same as information carried in an SSS of the second SSB, and information carried in a PSS of the first SSB is the same as information carried in a PSS of the second SSB. Alternatively, information carried in a PSS of the first SSB is the same as the information carried in a PSS of the second SSB, and the information carried in the PBCH of the first SSB is the same as the information carried in the PBCH of the second SSB. Alternatively, information carried in an SSS of the first SSB is the same as information carried in an SSS of the second SSB, and information carried in the PBCH of the first SSB is the same as information carried in the PBCH of the second SSB. Optionally, that the information carried in the PBCH of the first SSB is the same as the information carried in the PBCH of the second SSB may also be understood as that demodulation reference signals (DMRS) of the PBCHs of the first SSB and the second SSB are the same.

In an optional embodiment, some content carried in the PBCH of the first SSB and the PBCH of the second SSB may be different, and the different content may be preset. For example, a preset value differs between SSB indexes or SSB time indexes of the first SSB and the second SSB, a preset value differs between half-frame indications of the first SSB and the second SSB, or a preset value differs between values indicated by frame numbers of the first SSB and the second SSB. The preset value may be specified in a protocol to reduce a peak-to-average ratio of a signal.

In some embodiments, after determining the second SSB based on the first SSB, the terminal device may combine the PBCH of the first SSB and the PBCH of the second SSB and demodulate a combined PBCH. Because information carried in the first SSB is the same as information carried in the second SSB, the terminal device may combine the PBCH of the first SSB and the PBCH of the second SSB and demodulate a combined PBCH. In this manner, a signal-to-noise ratio can be improved, so that power of a noise signal in the environment is reduced by half, reliability of information transmission is improved, and further a coverage area of a cell is expanded.

In some embodiments, the second SSB is also a CD-SSB, and a cell corresponding to the first SSB is the same as a cell corresponding to the second SSB. In other words, the second SSB may be considered as a backup SSB for the first SSB. In this manner, the terminal device can perform cell synchronization by using the first SSB and the second SSB, and the terminal device determines a same cell by using the first SSB and the second SSB.

In some embodiments, the frequency domain position of the second SSB does not belong to the GSCN, that is, belongs to a non-GSCN. Positions of physical downlink control channels (PDCCH) of the SIB 1 indicated by the first SSB and the second SSB may be different. If the frequency domain position of the second SSB belongs to the GSCN, in a process of blindly detecting the SSB, a terminal device A may detect the first SSB, a terminal device B may detect the second SSB, the terminal device A determines a cell by using the first SSB, and the terminal device B determines another cell by using the second SSB. In other words, if the frequency domain position of the second SSB belongs to the GSCN, two cells may be determined by using the first SSB and the second SSB. Therefore, the frequency domain position of the second SSB does not belong to the GSCN. In this manner, another terminal device can be prevented from detecting the second SSB, so that a problem that the cell corresponding to the first SSB is different from the cell corresponding to the second SSB is not generated.

In some embodiments, the first SSB and the second SSB corresponding to a same time index have a quasi co-location (QCL) relationship. Specifically, the same time index may indicate a same symbol position or a same slot position. That there is a quasi co-location (QCL) relationship between the first SSB and the second SSB indicates that the first SSB and the second SSB may use one or more of a same delay spread, a same Doppler spread, a same average gain, a same average delay, a same spatial domain parameter sending or receiving signal, or a same beam used to send or receive a signal. In this manner, the terminal device can receive information about the first SSB and the second SSB.

In some embodiments, the method in this embodiment of this application may also be applied to transmission of a common physical downlink control channel. The common physical downlink control channel includes a physical downlink control channel for the system information, a physical downlink control channel for a paging message, and a physical downlink control channel for a random access response. Positions of a plurality of common physical downlink control channels may be configured by using the system information.

Based on FIG. 2 and the foregoing descriptions, it can be learned that in this embodiment of this application, the terminal device may find the second SSB based on a detected first SSB. The second SSB may be considered as a backup SSB for the first SSB. In this manner, after finding the first SSB and the second SSB, the terminal device may combine the received SSBs to improve a signal-to-noise ratio, so that power of a noise signal in a received signal is reduced by half, reliability of information transmission is improved, and further a coverage area of a cell is expanded.

In embodiments of the present invention, a device may be divided into functional units based on the foregoing method example. For example, each functional unit may be obtained through division based on a corresponding function, or two or more functions may be integrated into one unit. The integrated unit may be implemented in a form of hardware, or may be implemented in a form of a software functional unit. It should be noted that, in this embodiment of the present invention, unit division is an example, and is merely a logical function division, and there may be other division in actual implementation.

Figure 4:
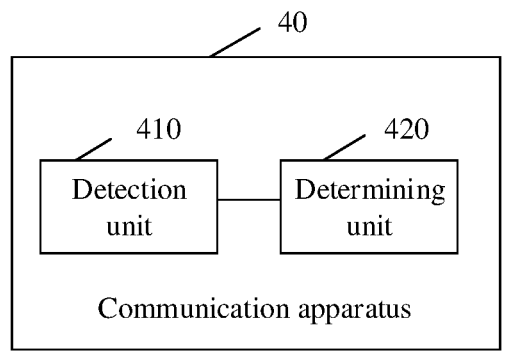
FIG. 4 is a schematic diagram of a communication apparatus according to an embodiment of this application.

FIG. 4 is a schematic diagram of a communication apparatus according to an embodiment of this application. For example, the communication apparatus may be a terminal device or a chip. The communication apparatus 40 includes a detection unit 410 and a determining unit 420. Details are as follows:

The detection unit 410 is configured to detect a first SSB. Specifically, for an operation performed by the detection unit 410, refer to the description in step S101 in the foregoing content.

The determining unit 420 is configured to determine a second SSB based on the first SSB. A frequency domain position of the first SSB and a frequency domain position of the second SSB are within a preset bandwidth, or a difference between frequency domain positions of the first SSB and the second SSB is a preset value, and both the first SSB and the second SSB are cell-defining synchronization signal blocks (CD-SSBs). Specifically, for an operation performed by the determining unit 420, refer to the description in step S102 in the foregoing content.

In some embodiments, the preset bandwidth is one of 21 RBs, 22 RBs, 23 RBs, 24 RBs, 48 RBs, or 96 RBs.

In some embodiments, an absolute value of the preset value is one or more of 21, 22, 23, 24, 25, 26, 27, 28, 29, 30, 31, 32, 33, 34, 35, 37, 38, 41, 42, 43, 47, 49, 95, or 97. A transceiver includes a receiver and a transmitter.

In some embodiments, the frequency domain position of the first SSB belongs to a global synchronization channel number (GSCN), and the frequency domain position of the second SSB does not belong to the GSCN.

In some embodiments, the first SSB and the second SSB corresponding to a same time index have a quasi co-location (QCL) relationship.

In some embodiments, a cell corresponding to the first SSB is the same as a cell corresponding to the second SSB.

In some embodiments, information carried in a synchronization signal of the first SSB is the same as information carried in a synchronization signal of the second SSB, and information carried in a PBCH of the first SSB is the same as information carried in a PBCH of the second SSB.

In some embodiments, the communication apparatus further includes a demodulation unit, where the demodulation unit is configured to combine the PBCH of the first SSB and the PBCH of the second SSB and demodulate a combined PBCH.

It should be noted that, for operations performed by various units of the communication apparatus 40 shown in FIG. 4, refer to the descriptions in the embodiment shown in FIG. 3. Details are not described herein again. The foregoing units may be implemented by hardware, software, or a combination of software and hardware. In an embodiment, functions of the detection unit 410, the determining unit 420, and the demodulation unit in the foregoing content may be implemented by one or more processors in the communication apparatus.

The communication apparatus shown in FIG. 4 may find the second SSB based on the detected first SSB. The second SSB may be considered as a backup SSB for the first SSB. In this manner, after finding the first SSB and the second SSB, the communication apparatus may combine the received SSBs to improve a signal-to-noise ratio, so that power of a noise signal in a received signal is reduced by half, reliability of information transmission is improved, and further a coverage area of a cell is expanded.

Figure 5:
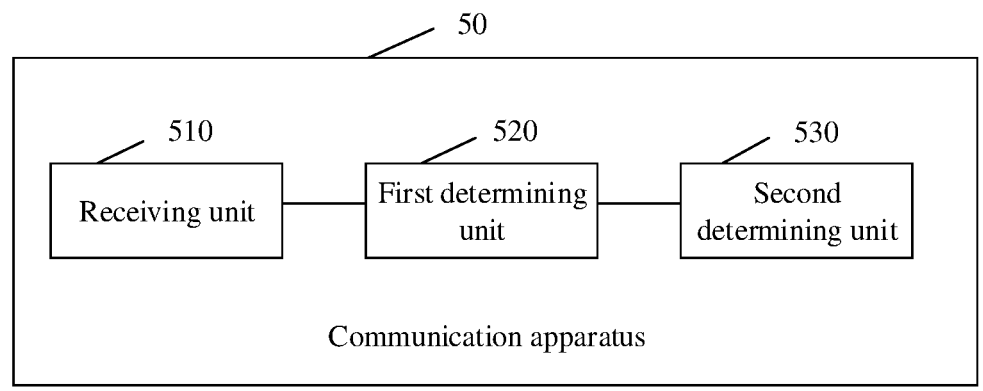
FIG. 5 is a schematic diagram of another communication apparatus according to an embodiment of this application.

FIG. 5 is a schematic diagram of another communication apparatus according to an embodiment of this application. For example, the communication apparatus may be a terminal device or a chip. The communication apparatus 50 includes a receiving unit 510, a first determining unit 520 and a second determining unit 530. Details are as follows:

The receiving unit 510 is configured to receive a first synchronization signal of a first SSB sent by a network device. Specifically, for an operation performed by the receiving unit 510, refer to the description in step S101 in the foregoing content.

The first determining unit 520 may be configured to determine a frequency domain position of the first SSB based on the first synchronization signal.

The second determining unit 530 may be configured to determine a frequency domain position of a second SSB based on the frequency domain position of the first SSB. Specifically, for operations performed by the first determining unit 520 and the second determining unit 530, refer to the description in step S102 in the foregoing content.

In some embodiments, the second determining unit 530 is specifically configured to detect a second synchronization signal of the second SSB within a preset bandwidth to which the frequency domain position of the first SSB belongs; and determine the frequency domain position of the second SSB based on the second synchronization signal.

In some embodiments, the preset bandwidth is any one of 21 RBs, 22 RBs, 23 RBs, 24 RBs, 48 RBs, or 96 RBs.

In some embodiments, the second determining unit 530 is specifically configured to detect a third synchronization signal of the second SSB at a frequency domain position that differs from the frequency domain position of the first SSB by a preset value; and determine the frequency domain position of the second SSB based on the third synchronization signal.

In some embodiments, an absolute value of the preset value is any one of 21, 22, 23, 24, 25, 26, 27, 28, 29, 30, 31, 32, 33, 34, 35, 37, 38, 41, 42, 43, 47, 49, 95, or 97.

In some embodiments, the frequency domain position of the first SSB belongs to a GSCN, and the frequency domain position of the second SSB does not belong to the GSCN.

In some embodiments, the first SSB and the second SSB corresponding to a same time index have a quasi co-location (QCL) relationship.

In some embodiments, the first SSB is a cell-defining synchronization signal block (CD-SSB), and the second SSB is a CD-SSB.

In some embodiments, a cell corresponding to the first SSB is the same as a cell corresponding to the second SSB.

In some embodiments, information carried in a synchronization signal of the first SSB is the same as information carried in a synchronization signal of the second SSB, and information carried in a PBCH of the first SSB is the same as information carried in a PBCH of the second SSB.

In some embodiments, the communication apparatus further includes a demodulation unit, where the demodulation unit is configured to combine the PBCH of the first SSB and the PBCH of the second SSB and demodulate a combined PBCH.

It should be noted that, for operations performed by various units of the communication apparatus 50 shown in FIG. 5, refer to the descriptions in the embodiment shown in FIG. 3. Details are not described herein again. The foregoing units may be implemented by hardware, software, or a combination of software and hardware. In an embodiment, functions of the detection unit 510, the first determining unit 520, and the second determining unit 530 in the foregoing content may be implemented by one or more processors in the communication apparatus. The communication apparatus shown in FIG. 5 may find the second SSB based on the detected first SSB. The second SSB may be considered as a backup SSB for the first SSB. In this manner, after finding the first SSB and the second SSB, the communication apparatus may combine the received SSBs to improve a signal-to-noise ratio, so that power of a noise signal in a received signal in the environment is reduced by half, reliability of information transmission is improved, and further a coverage area of a cell is expanded.

Figure 6:
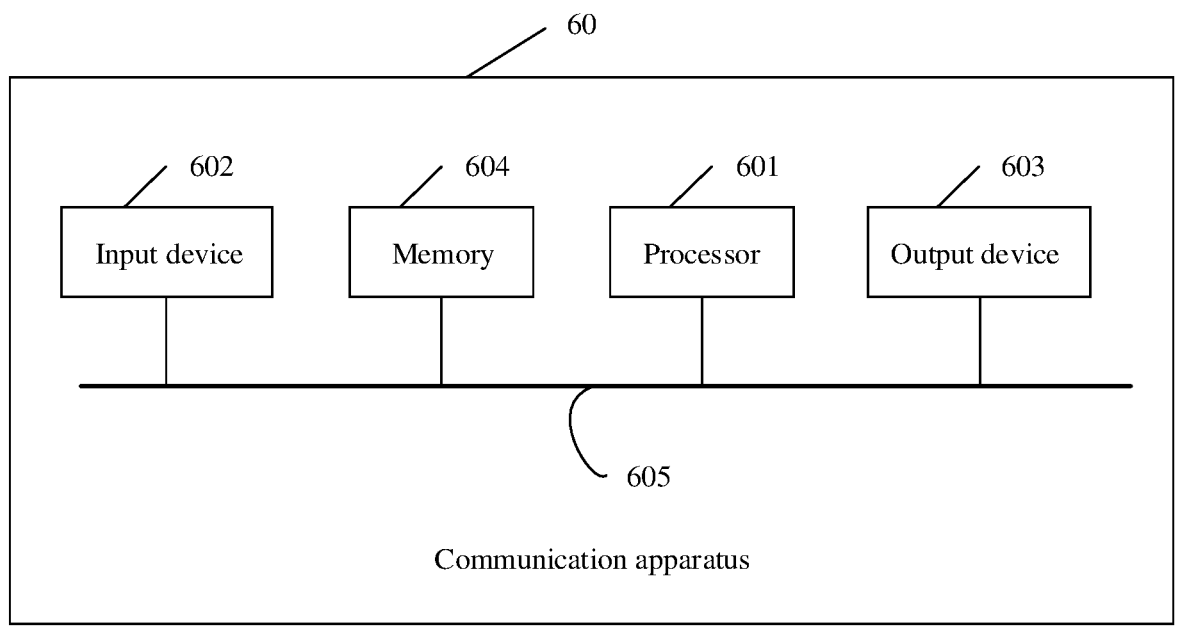
FIG. 6 is a schematic diagram of another communication apparatus according to an embodiment of this application.

FIG. 6 is a schematic diagram of another communication apparatus according to an embodiment of this application. For example, the communication apparatus may be a terminal device. The communication apparatus 60 may include one or more processors 601, one or more input devices 602, one or more output devices 603, and a memory 604. The processor 601, the input device 602, the output device 603, and the memory 604 are connected via a bus 605. The memory 604 is configured to store a program.

The processor 601 may be a central processing unit (CPU), a general-purpose processor, a coprocessor, a digital signal processor (DSP), an application-specific integrated circuit (ASIC), a field programmable gate array (FPGA) or another programmable logic device, a transistor logic device, a hardware component, or any combination thereof. Alternatively, the processor 601 may be a combination of processors implementing a computing function, for example, a combination of one or more microprocessors, or a combination of a DSP and a microprocessor.

The input device 602 may include an antenna, a communication interface, and the like. The output device 603 may include an antenna, a communication interface, and the like. Optionally, the input device 602 may be a receiver, and the output device 603 may be a transmitter. Optionally, the input device 602 and the output device 603 may jointly form a transceiver.

The memory 604 may include a read-only memory and a random access memory, and provide a program and data for the processor 601. A part of the memory 604 may further include a non-volatile random access memory. For example, the memory 604 may further store information about a device type.

The processor 601 is configured to run the program stored in the memory 604 to perform the following operations: detecting a first SSB, where optionally, the processor 601 may detect the first SSB by using the input device 602, the input device 602 may be the receiver in the transceiver, and specifically, for an execution manner of the operation, refer to the description in step S101 in the foregoing content; and determining a second SSB based on the first SSB, where a frequency domain position of the first SSB and a frequency domain position of the second SSB are within a preset bandwidth, or a difference between frequency domain positions of the first SSB and the second SSB is a preset value, and both the first SSB and the second SSB are cell-defining synchronization signal blocks (CD-SSBs). Specifically, for an execution manner of the operation, refer to the description in step S102 in the foregoing content.

For implementation of the operations in FIG. 6, further refer to corresponding descriptions in the method embodiment shown in FIG. 3.

The communication apparatus shown in FIG. 6 may find the second SSB based on the detected first SSB. The second SSB may be considered as a backup SSB for the first SSB. In this manner, after finding the first SSB and the second SSB, the communication apparatus may combine the received SSBs to improve a signal-to-noise ratio, so that power of a noise signal in a received signal in the environment is reduced by half, reliability of information transmission is improved, and further a coverage area of a cell is expanded.

Figure 7:
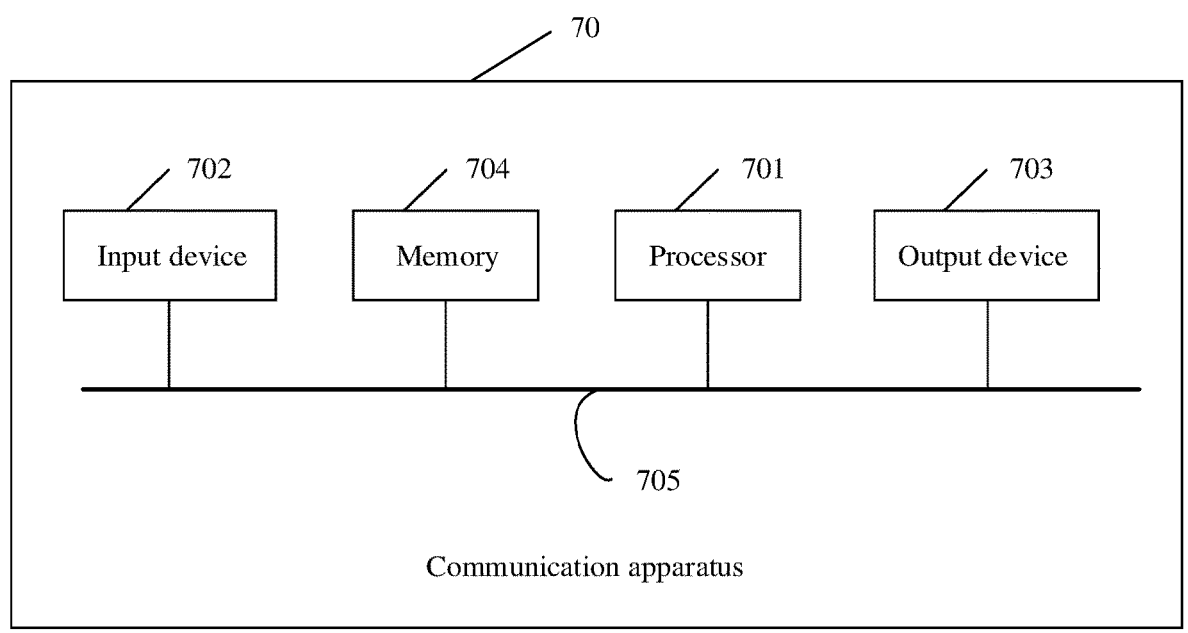
FIG. 7 is a schematic diagram of another communication apparatus according to an embodiment of this application.

FIG. 7 is a schematic diagram of another communication apparatus according to an embodiment of this application. For example, the communication apparatus may be a terminal device. The communication apparatus 70 may include one or more processors 701, one or more input devices 702, one or more output devices 703, and a memory 704. The processor 701, the input device 702, the output device 703, and the memory 704 are connected via a bus 705. The memory 704 is configured to store a program.

The processor 701 may be a central processing unit (CPU), a general-purpose processor, a coprocessor, a digital signal processor (DSP), an application-specific integrated circuit (ASIC), a field programmable gate array (FPGA) or another programmable logic device, a transistor logic device, a hardware component, or any combination thereof. Alternatively, the processor 701 may be a combination of processors implementing a computing function, for example, a combination of one or more microprocessors, or a combination of a DSP and a microprocessor.

The input device 702 may include an antenna, a communication interface, and the like. The output device 703 may include an antenna, a communication interface, and the like. Optionally, the input device 702 may be a receiver, and the output device 703 may be a transmitter. The input device 702 and the output device 703 may jointly form a transceiver.

The memory 704 may include a read-only memory and a random access memory, and provide a program and data for the processor 701. A part of the memory 704 may further include a non-volatile random access memory. For example, the memory 704 may further store information about a device type.

The processor 701 is configured to run the program stored in the memory 704 to perform the following operations: receiving a first synchronization signal of a first SSB sent by a network device, where optionally, the processor 701 may detect the first SSB by using the input device 702, the input device 702 may be the receiver in the transceiver, and specifically, for an execution manner of the operation, refer to the description in step S101 in the foregoing content; determining a frequency domain position of the first SSB based on the first synchronization signal; and determining a frequency domain position of a second SSB based on the frequency domain position of the first SSB. Specifically, for an execution manner of the operation, refer to the description in step S102 in the foregoing content.

For implementation of the operations in FIG. 7, further refer to corresponding descriptions in the method embodiment shown in FIG. 3.

The communication apparatus shown in FIG. 7 may find the second SSB based on the detected first SSB. The second SSB may be considered as a backup SSB for the first SSB. In this manner, after finding the first SSB and the second SSB, the communication apparatus may combine the received SSBs to improve a signal-to-noise ratio, so that power of a noise signal in a received signal in the environment is reduced by half, reliability of information transmission is improved, and further a coverage area of a cell is expanded.

This application further provides another communication apparatus, where the communication apparatus includes a processor. When the processor invokes a computer program in a memory, the method implemented in the embodiment shown in FIG. 3 is performed.

This application further provides another communication apparatus, where the communication apparatus includes a memory and a processor. The memory is configured to store a computer program. When the processor invokes the computer program in the memory, the method implemented in the embodiment shown in FIG. 3 is performed.

This application further provides another computer-readable storage medium, where the computer-readable storage medium includes a computer program or instructions. When the computer program or the instructions are run on a computer, the computer is enabled to perform the method implemented in the embodiment shown in FIG. 3.

This application further provides a computer program product, where the computer program product includes a computer program or instructions. When the computer program or the instructions are run on a computer, the computer is enabled to perform the method implemented in the embodiment shown in FIG. 3.

This application further provides a chip, where the chip includes a processor and a communication interface, and the processor is configured to perform the method implemented in the embodiment shown in FIG. 3.

This application further provides another chip, where the chip includes a processor, a memory and a communication interface. The memory stores a computer program, and the processor is configured to perform the computer program to implement the method implemented in the embodiment shown in FIG. 3.

A person skilled in the art should be aware that in the foregoing one or more examples, functions described in the present invention may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium, where the communication medium includes any medium that facilitates transmission of a computer program from one place to another. The storage medium may be any available medium accessible to a general-purpose or a special-purpose computer.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   detecting, by a terminal device, a first synchronization signal block (SSB);
   determining, by the terminal device, a second SSB based on the first SSB, wherein a frequency domain position of the first SSB and a frequency domain position of the second SSB are within a preset bandwidth, or a difference between frequency domain positions of the first SSB and the second SSB is a preset value, and both the first SSB and the second SSB are cell-defining synchronization signal blocks (CD-SSBs) that define a cell, and wherein information carried in a synchronization signal of the first SSB is the same as information carried in a synchronization signal of the second SSB, and information carried in a physical broadcast channel (PBCH) of the first SSB is the same as information carried in a PBCH of the second SSB; and
   combining, by the terminal device, the PBCH of the first SSB and the PBCH of the second SSB to form a combined PBCH, and demodulating, by the terminal device, the combined PBCH.

2. The method according to claim 1, wherein the preset bandwidth is one of 21 resource blocks (RBs), 22 RBs, 23 RBs, 24 RBs, 48 RBs, or 96 RBs.

3. The method according to claim 1, wherein an absolute value of the preset value is one or more of 21, 22, 23, 24, 25, 26, 27, 28, 29, 30, 31, 32, 33, 34, 35, 37, 38, 41, 42, 43, 47, 49, 95, or 97 resource blocks (RBs).

4. The method according to claim 1, wherein the frequency domain position of the first SSB belongs to a global synchronization channel number (GSCN), and the frequency domain position of the second SSB does not belong to the GSCN.

5. The method according to claim 1, wherein the first SSB and the second SSB correspond to a same time index and have a quasi co-location (QCL) relationship.

6. The method according to claim 1, wherein a cell corresponding to the first SSB is the same as a cell corresponding to the second SSB.

7. A method, comprising:
   receiving, by a terminal device, a synchronization signal of a first synchronization signal block (SSB) sent by a network device;

determining, by the terminal device, a frequency domain position of the first SSB based on the synchronization signal of the first SSB;

determining, by the terminal device, a frequency domain position of a second SSB based on the frequency domain position of the first SSB, wherein information carried in the synchronization signal of the first SSB is the same as information carried in a synchronization signal of the second SSB, and information carried in a physical broadcast channel (PBCH) of the first SSB is the same as information carried in a PBCH of the second SSB;

combining, by the terminal device, the PBCH of the first SSB and the PBCH of the second SSB, to form a combined PBCH; and demodulating, by the terminal device, the combined PBCH.

8. The method according to claim 7, wherein determining, by the terminal device, the frequency domain position of the second SSB based on the frequency domain position of the first SSB comprises:

detecting, by the terminal device, the synchronization signal of the second SSB within a preset bandwidth to which the frequency domain position of the first SSB belongs; and determining, by the terminal device, the frequency domain position of the second SSB based on the synchronization signal of the second SSB.

9. The method according to claim 8, wherein the preset bandwidth is any one of 21 resource blocks (RBs), 22 RBs, 23 RBs, 24 RBs, 48 RBs, or 96 RBs.

10. The method according to claim 7, wherein determining, by the terminal device, the frequency domain position of the second SSB based on the frequency domain position of the first SSB comprises:

detecting, by the terminal device, a third synchronization signal of the second SSB at a frequency domain position that differs from the frequency domain position of the first SSB by a preset value; and determining, by the terminal device, the frequency domain position of the second SSB based on the third synchronization signal.

11. The method according to claim 10, wherein an absolute value of the preset value is any one of 21, 22, 23, 24, 25, 26, 27, 28, 29, 30, 31, 32, 33, 34, 35, 37, 38, 41, 42, 43, 47, 49, 95, or 97 resource blocks (RBs).

12. The method according to claim 7, wherein the frequency domain position of the first SSB belongs to a global synchronization channel number (GSCN), and the frequency domain position of the second SSB does not belong to the GSCN.

13. The method according to claim 7, wherein the first SSB and the second SSB correspond to a same time index and have a quasi co-location (QCL) relationship.

14. The method according to claim 7, wherein the first SSB is a cell-defining synchronization signal block (CD-SSB) that defines a cell, and the second SSB is a CD-SSB that defines the cell.

15. The method according to claim 7, wherein a cell corresponding to the first SSB is the same as a cell corresponding to the second SSB.

16. An apparatus, comprising:
at least one processor; and
a non-transitory computer readable storage medium storing a program that is executable by the at least one processor, the program including instructions to:

detect a first synchronization signal block (SSB);

determine a second SSB based on the first SSB, wherein a frequency domain position of the first SSB and a frequency domain position of the second SSB are within a preset bandwidth, or a difference between frequency domain positions of the first SSB and the second SSB is a preset value, and both the first SSB and the second SSB are cell-defining synchronization signal blocks (CD-SSBs) that define a cell, and wherein information carried in a synchronization signal of the first SSB is the same as information carried in a synchronization signal of the second SSB, and information carried in a physical broadcast channel (PBCH) of the first SSB is the same as information carried in a PBCH of the second SSB; and combining a PBCH of the first SSB and a PBCH of the second SSB to form a combined PBCH, and demodulating the combined PBCH.

17. The apparatus according to claim 16, wherein the preset bandwidth is one of 21 resource blocks (RBs), 22 RBs, 23 RBs, 24 RBs, 48 RBs, or 96 RBs.

18. The apparatus according to claim 16, wherein an absolute value of the preset value is one or more of 21, 22, 23, 24, 25, 26, 27, 28, 29, 30, 31, 32, 33, 34, 35, 37, 38, 41, 42, 43, 47, 49, 95, or 97 resource blocks (RBs).

19. The apparatus according to claim 16, wherein the frequency domain position of the first SSB belongs to a global synchronization channel number (GSCN), and the frequency domain position of the second SSB does not belong to the GSCN.

20. The apparatus according to claim 16, wherein the first SSB and the second SSB correspond to a same time index and have a quasi co-location (QCL) relationship.

* * * * *